United States Patent
Vakeesar et al.

(10) Patent No.: US 11,700,550 B2
(45) Date of Patent: Jul. 11, 2023

(54) PREDICTIVE QOS SUPPORT

(71) Applicant: Huawei Technologies Co., Ltd., Shenzhen (CN)

(72) Inventors: Siva Vakeesar, Kista (SE); Ali Hamidian, Kista (SE); Antonio Consoli, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 17/141,916

(22) Filed: Jan. 5, 2021

(65) Prior Publication Data

US 2021/0127299 A1    Apr. 29, 2021

Related U.S. Application Data

(63) Continuation of application No. PCT/EP2018/080654, filed on Nov. 8, 2018.

(30) Foreign Application Priority Data

Oct. 4, 2018    (WO) .................. PCT/EP2018/076971

(51) Int. Cl.
*H04W 28/08* (2023.01)
*H04W 8/24* (2009.01)
(Continued)

(52) U.S. Cl.
CPC ......... *H04W 28/0942* (2020.05); *H04W 8/24* (2013.01); *H04W 28/0268* (2013.01); *H04W 36/0044* (2013.01); *H04W 36/22* (2013.01)

(58) Field of Classification Search
CPC .......... H04L 65/80; H04L 67/61; H04W 8/24; H04W 28/0268; H04W 28/0942; H04W 36/0044; H04W 36/22
See application file for complete search history.

(56) References Cited

U.S. PATENT DOCUMENTS

| | | | |
|---|---|---|---|
| 7,023,825 | B1 | 4/2006 | Haumont et al. |
| 2005/0239465 | A1* | 10/2005 | Lee .................. H04W 36/26 455/442 |

(Continued)

FOREIGN PATENT DOCUMENTS

| | | |
|---|---|---|
| CN | 1981490 A | 6/2007 |
| CN | 102484817 A | 5/2012 |

(Continued)

OTHER PUBLICATIONS

Wang et al.,"A Network Access Control Approach for QoS Support based on the AAA Architecture," 2010 International Symposium on Intelligence Information Processing and Trusted Computing, pp. 507-511 (2010).

(Continued)

*Primary Examiner* — Khoa Huynh
(74) *Attorney, Agent, or Firm* — Leydig, Voit & Mayer, Ltd.

(57) ABSTRACT

A network node and method performed thereby, for enabling determination, by a prediction function network node, of a change in QoS of a communication session of a UE. The method includes obtaining information related to the UE communication session, the information including an ID of the UE and an ID of the communication session. The method further comprises determining the target serving cell of the UE and providing the obtained information and an ID of the determined target serving cell to the prediction function network node, thereby enabling the prediction function network node to determine new QoS of the UE communication session when being served by the target serving cell. A prediction function network node and a method performed thereby, and a user equipment and a method performed thereby are also disclosed.

12 Claims, 7 Drawing Sheets

(51) Int. Cl.
*H04W 28/02* (2009.01)
*H04W 36/00* (2009.01)
*H04W 36/22* (2009.01)

(56) References Cited

U.S. PATENT DOCUMENTS

| | | | |
|---|---|---|---|
| 2005/0250498 A1* | 11/2005 | Lim | H04W 36/26 455/436 |
| 2012/0163171 A1 | 6/2012 | Lee et al. | |
| 2014/0086046 A1 | 3/2014 | Reeves et al. | |

FOREIGN PATENT DOCUMENTS

| | | |
|---|---|---|
| CN | 106664618 A | 5/2017 |
| EP | 2518941 A1 | 10/2012 |
| WO | 2015193727 A1 | 12/2015 |
| WO | 2016171716 A1 | 10/2016 |

OTHER PUBLICATIONS

Zhu Wan, "Research of MAC Technology with QoS for CoITS Wireless Access Network," Southeast University, total 35 pages (Apr. 2016). With an English abstract.

"3rd Generation Partnership Project; Technical Specification Group Services and System Aspects; Study on enhancement of 3GPP Support for 5G V2X Services (Release 16)," 3GPP TR 22.886 V16.0.0, pp. 1-67, 3rd Generation Partnership Project, Valbonne, France (Jun. 2018).

"3rd Generation Partnership Project; Technical Specification Group Radio Access Network; NG-RAN; NG Application Protocol (NGAP) (Release 15)," 3GPP TS 38.413 V0.8.0, pp. 1-164, 3rd Generation Partnership Project, Valbonne, France (Apr. 2018).

"3rd Generation Partnership Project; Technical Specification Group Services and System Aspects; Study on architecture enhancements for EPS and 5G System to support advanced V2X services (Release 16)," 3GPP TR 23.786 V0.5.0, pp. 1-37, 3rd Generation Partnership Project, Valbonne, France (May 2018).

"3rd Generation Partnership Project; Technical Specification Group Services and System Aspects; System Architecture for the 5G System; Stage 2 (Release 15)," 3GPP TS 23.501 V15.1.0, pp. 1-201, 3rd Generation Partnership Project, Valbonne, France (Mar. 2018).

"3rd Generation Partnership Project; Technical Specification Group Services and System Aspects; Procedures for the 5G System; Stage 2 (Release 15)," 3GPP TS 23.502 V15.1.0, pp. 1-285, 3rd Generation Partnership Project, Valbonne, France (Mar. 2018).

"3rd Generation Partnership Project; Technical Specification Group Core Network and Terminals; Non-Access-Stratum (NAS) protocol for 5G System (5GS); Stage 3 (Release 15)," 3GPP TS 24.501 V1.1.1, pp. 1-297, 3rd Generation Partnership Project, Valbonne, France (May 2018).

"3rd Generation Partnership Project; Technical Specification Group Services and System Aspects; Management and orchestration of networks and network slicing; NR and NG-RAN performance measurements and assurance data (Release 15)," 3GPP TS 28.552 V0.2.0, pp. 1-11, 3rd Generation Partnership Project, Valbonne, France (Apr. 2018).

"3rd Generation Partnership Project; Technical Specification Group Services and System Aspects; Telecommunication management; Management and orchestration of networks and network slicing; 5G End to end Key Performance Indicators (KPI), performance measurements and assurance data (Release 15)," 3GPP TS 28.554 V0.2.0, pp. 1-12, 3rd Generation Partnership Project, Valbonne, France (Apr. 2018).

"3rd Generation Partnership Project; Technical Specification Group Services and System Aspects; Telecommunication management; Performance Management (PM); Performance measurements Evolved Universal Terrestrial Radio Access Network (E-UTRAN) (Release 15)," 3GPP TS 32.425 V15.0.0, pp. 1-87, 3rd Generation Partnership Project, Valbonne, France (Mar. 2018).

"3rd Generation Partnership Project; Technical Specification Group Services and System Aspects; Study on enhancement of 3GPP Support for 5G V2X Services (Release 15)," 3GPP TR 22.886 V15.1.0, pp. 1-58, 3rd Generation Partnership Project, Valbonne, France (Mar. 2017).

"3rd Generation Partnership Project; Technical Specification Group Services and System Aspects; Study on enhancement of 3GPP Support for 5G V2X Services (Release 16),"3GPP TR 22.886 V16.1.1, pp. 1-74, 3rd Generation Partnership Project, Valbonne, France (Sep. 2018).

* cited by examiner

PREDICTIVE QOS SUPPORT

CROSS-REFERENCE TO RELATED APPLICATIONS

This application is a continuation of International Application No. PCT/EP2018/080654, filed on Nov. 8, 2018, which claims priority to International Patent Application No. PCT/EP2018/076971, filed on Oct. 4, 2018. The disclosures of the aforementioned applications are hereby incorporated by reference in their entireties.

TECHNICAL FIELD

The present disclosure generally relates to a network node, a method of the network node, a prediction function network node, a method of the prediction function network node, a user equipment, and a method of the user equipment. In particular, a mechanism is herein described, for determining, by a prediction function network node, a change in Quality of Service (QoS) of a communication session of a user equipment.

BACKGROUND

The need to support Predictive Quality of Service (P-QoS) had recently been felt by different industries and in response Service and System Aspects 1 (SA1) recently agreed on some requirements in this direction as part of third Generation Partnership Project (3GPP) Work Item FS V2XIMP. The relevant SA1 requirements were captured in TR 22.886 V16.1.1. Although relevant Stage 1 related requirements are captured, it is not clear in 3GPP in terms of what entity is responsible for collecting prediction related data and notifying its prediction results.

Given that the Radio Access Network (RAN) remains a bottleneck due to scarce spectrum and time-varying radio signal propagations, there is a need to always indicate to a Predictive Function (PF) as to which cell currently serves a User Equipment (UE) in question. According to Technical Specifications TS 28.552, TS 28.554, TS 32.425, a network ability to provide certain QoS boils down to current load, residual capacity and capabilities of a cell. Hence, serving cell identity is important for a PF to know in order to make Packet Data Unit (PDU) Session-Specific predictions. In this respect, after a handover, mechanisms have to be in place to notify a PF as to which cell a UE has been handed over and these related aspects were not looked into by any prior art.

Existing prior art deals with an issue of how a network has to react especially in the RAN when a QoS changes in terms of applying different Adaptive Modulation and Coding (ADC) schemes, dual connectivity, carrier aggregation, Coordinated Multi-Point (CoMP) transmission and similar techniques. It is hence different from the proactive approach the apparatuses and methods of the current disclosure pertain to where preventive measures are taken in advance based on QoS change prediction. At the moment, after dimensioning a network, the 5th Generation System (5GS) reactively handles any connection related problem. In other words, after a PDU Session is established, the 5GS tries to take all possible measures to meet QoS requirements of each established session and in case it cannot meet QoS requirements especially those that pertain to Guaranteed Bit Rate (GBR)-traffic, a RAN will trigger Notification Control and the 5th Generation Core (5GC) Network will take appropriate action in terms of how to handle a session (e.g., dropping it totally). Such an approach has recently been enhanced with a solution whereby each QoS flow of a PDU Session consists of more than 1 QoS profile and in case QoS change happens, the new Notification Control will include appropriate QoS profile per flow that is suitable at a given time.

Vehicle-to-everything (V2X) communication is the passing of information from a vehicle to any entity that may affect the vehicle, and vice versa. Given that in the case of V2X involving especially high Level of Automation (LoA), bringing a vehicle to total safety may involve switching between a remote driver and a local driver, braking or slowing-down that requires some mechanical actions. As most of mechanical actions (e.g., bringing the vehicle that has been driven at 200 km/h to a halt) require some reaction time, totally relying on a reactive approach will not be ideal.

An ability of a cellular network to provide a required QoS for a UE mainly depends at least on the following attributes of a cell: capabilities (e.g., radio or Radio Resource Management (RRM) capabilities employed by a cell such as Dual Connectivity, different Adaptive Modulation and Coding (ADC) schemes, carrier aggregation, Coordinated Multi-Point (CoMP) transmission, etc.); Radio Access Type (RAT), e.g. Global System for Mobile communications (originally: Groupe Spécial Mobile) (GSM), Universal Mobile Telecommunications System (UMTS), Long Term Evolution (LTE) and/or 5G; Residual capacity; and/or Current load. Frequency in use by a cell can be useful as radio propagation can be different for different frequency ranges.

It is a general understanding based on the previously mentioned Technical Standards TS 28.552, TS 28.554, TS 32.425 that the PF can collect cell specific information either indirectly from Operations Administration and Maintenance (OAM) or directly from RAN per cell identifier. It would be desired for the PF to predict QoS of each QoS flow per PDU Session belonging to the UE in question, also and perhaps in particular in a scenario wherein the UE is moving fast between cells.

SUMMARY

The present disclosure provides for obviating at least some of the above-mentioned disadvantages and for improving a Predictive-QoS (P-QoS) support.

According to a first aspect of the present disclosure, a network node is provided for enabling determination, by a prediction function network node, of a change in QoS of a PDU communication session of a user equipment. The network node is configured to obtain information related to the communication session of the user equipment, comprising: an identity reference of the user equipment, and an identity reference of the communication session. Further, the network node is configured to determine the target serving cell of the user equipment. The network node is also configured to provide the obtained information and an identity reference of the determined target serving cell to the prediction function network node, enabling the prediction function network node to determine a new QoS of the communication session of the user equipment when being served by the target serving cell.

It may be assumed that at the time of the communication session establishment, the prediction function network node is notified of QoS requirements of each QoS flow identified by QoS Flow Id (QFI) belonging to the communication session established by the user equipment. Also, the prediction function network node may be notified of thresholds associated with QoS profiles supported for each QoS flow and hence, the prediction function network node knows that in case predicted QoS passes a threshold associated with a supported QoS profile, the prediction function network node may warn or notify the user equipment.

Thanks to the described aspect, by providing information concerning identity reference of the target serving cell to the prediction function network node, the prediction function network node is enabled to predict a change in QoS for the communication session of the user equipment. In order to help the prediction function network node to predict the change in QoS, a mechanism is provided to notify the prediction function network node regarding which target serving cell the user equipment is handed over to.

In a first possible implementation of the network node according to the first aspect, the network node is associated with a source serving cell of the user equipment. The network node is configured to obtain information related to the communication session of the user equipment, comprising: an indication of the capability of the user equipment to maintain at least two QoS profiles. The source serving cell is configured to provide information concerning the indication of the capability of the user equipment to maintain at least two QoS profiles, to the determined target serving cell.

Thereby, the target serving cell becomes aware of multiple QoS profile support of the user equipment so that the target serving cell may recommend an appropriate QoS profile per QoS flow when it generates a Notification Control that is suited to the current QoS conditions.

In a second possible implementation of the network node according to the first aspect, the network node is associated with a target serving cell of the user equipment. The network node is further configured to obtain a P-QoS support capability of the user equipment; and to provide an identity reference of the target serving cell to the prediction function network node when the communication session of the user equipment requires P-QoS support.

The target serving cell is thereby provided with information concerning whether a handed over communication session/user equipment requires P-QoS support, which enables a target serving cell to provide its identity to a prediction function network node once a handover has been executed for the user equipment in question. In case the communication session/user equipment does not require P-QoS support, the identity reference of the target serving cell may not necessarily be provided.

By providing the target serving cell identity on to the prediction function network node, it becomes possible for the prediction function network node to check whether there will be a QoS change for the communication session of the user equipment, given the capabilities and current load of the target serving cell.

In a third possible implementation of the network node according to the first aspect, or any implementation thereof, the network node is configured to handing over the communication session of the user equipment from the source serving cell to the target serving cell.

In a fourth possible implementation of the network node according to the first aspect, or any implementation thereof, the network node is associated with an Access and Mobility Management Function.

In a fifth possible implementation of the network node according to the first aspect, or any implementation thereof, the network node is further configured to provide the obtained information comprising the P-QoS support capability of the user equipment, to the prediction function network node at about the time of creation of the communication session of the user equipment.

According to a second aspect of the present disclosure, a prediction function network node is provided, for determining a change in QoS of a communication session of a user equipment. The prediction function network node is configured to obtain information related to the communication session of the user equipment, comprising an identity reference of the user equipment; an identity reference of the communication session; P-QoS support capability of the user equipment; an identity reference of the target serving cell, from the network node. Further, the prediction function network node is configured to determine a new QoS of the communication session of the user equipment when being served by the target serving cell, based on the obtained information.

Thanks to the described aspect, by passing information concerning whether the user equipment supports P-QoS and passing an identity reference of the target serving cell to the prediction function network node, the prediction function network node is enabled to predict a change in QoS for the communication session of the user equipment. Thereby, a mechanism is provided to notify the prediction function network node to which target serving cell the user equipment is handed over.

In a first possible implementation of the prediction function network node according to the second aspect, the prediction function network node is further configured to obtain additional information associated with the target serving cell of the user equipment, and such additional information has potential to affect the QoS of the communication session of the user equipment when being served by the target serving cell. Also, the prediction function network node is configured to determine the new QoS of the communication session, further based on the obtained additional information.

The additional information associated with the target serving cell of the user equipment may comprise e.g. Radio Access Technology (RAT type), radio capabilities, namely Dual Connectivity (DC), Carrier Aggregation (CA), Coordinated Multi-Point Access (COMP), as well as frequency in use, weather, road traffic intensity, and/or cell load or population. By collecting the additional information and predicting the new QoS of the communication session while taking the additional information into account, the new QoS may be predicted with better precision.

In a second possible implementation of the prediction function network node according to the second aspect, or any implementation thereof, the obtained information comprises an indication of the capability of the user equipment to maintain at least two QoS profiles. The prediction function network node is further configured to determine the new QoS of the communication session, further based on the obtained information concerning the capability of the user equipment to maintain at least two QoS profiles.

Thereby, the prediction function network node becomes aware of multiple QoS profile support of the user equipment and may predict a change in QoS of the communication session of the user equipment based on the multiple QoS profile support, and/or recommend the correct QoS profile that has to be used for the communication session based on the predictions.

In a third possible implementation of the prediction function network node according to the second aspect, or any implementation thereof, the prediction function network node is configured to provide information concerning the determined new QoS of the communication session of the user equipment, to the user equipment.

By informing the user equipment concerning the new QoS in advance, measures may be taken to adapt any application of the user equipment to the new QoS—e.g., changing QoS profile of a QoS flow or take corrective actions in terms of e.g., changing speed or inter-vehicle distance. In case the new QoS is lower than the previous QoS level, the user is prepared and warned that the application may have to be switched off. In case the new QoS is higher than the previous QoS level, additional applications may be started.

In a fourth possible implementation of the prediction function network node according to the second aspect, or any implementation thereof, the prediction function network node is notified when the communication session of the user equipment is handed over from the source serving cell to the target serving cell, and wherein the prediction function network node is configured to determine the new QoS of the communication session of the user equipment, based at least on a capability/capacity of the target serving cell.

Hereby, the prediction function network node is further specified.

According to a third aspect of the present disclosure, a user equipment is provided, for enabling determination, by a prediction function network node according to the fourth aspect, of a change in Quality of Service of a communication session of the user equipment. The user equipment is configured to obtain information related to the target serving cell of the user equipment. Also, the user equipment is configured to provide the obtained information related to the target serving cell, to the prediction function network node.

Thanks to the described aspect, by obtaining information related to the target serving cell of the user equipment and providing the information to the prediction function network node, an alternative mechanism for providing this information to the prediction function network node is provided.

In a first possible implementation of the user equipment according to the third aspect, the user equipment is further configured to transmit information concerning P-QoS support capability of the user equipment to the network node according to the first aspect.

Again, an alternative mechanism for providing certain information to the prediction function network node is provided, thereby enabling the prediction function network node to predict the new QoS.

In a second possible implementation of the user equipment according to the third aspect, or the first implementation thereof, the transmitted information further comprises an indication of the capability of the user equipment to maintain at least two QoS profiles.

Thereby, the prediction function network node becomes aware of multiple QoS profile support of the user equipment and may predict a change in QoS of the communication session of the user equipment based on the multiple QoS profile support.

In a third possible implementation of the user equipment according to the third aspect, or any implementation thereof, the user equipment is further configured to receive information concerning a change in QoS when being served by the target serving cell.

The user equipment and its user are thereby also alerted about the upcoming change in QoS. The user may for example save and terminate the currently running application when the change in QoS involves a decrease in QoS, and/or start a new function when the QoS is predicted to increase.

According to a fourth aspect of the present disclosure, a method in a network node is provided for enabling determination, by a prediction function network node, of a change in QoS of a communication session of a user equipment. The method comprises the steps of obtaining information related to the communication session of the user equipment, comprising an identity reference of the user equipment, and an identity reference of the established PDU communication session. The method also comprises determining the target serving cell of the user equipment. In addition, the method furthermore comprises providing the obtained information and an identity reference of the determined target serving cell to the prediction function network node, enabling the prediction function network node to determine a new QoS of the communication session of the user equipment when being served by the target serving cell.

It may be assumed that at the time of the PDU Session establishment, the prediction function network node is notified of QoS requirements of each QoS flow identified by QoS Flow Id (QFI) belonging to the PDU Session established by the user equipment. Also, the prediction function network node is notified of thresholds associated with QoS profiles supported for each QoS flow and hence, the prediction function network node knows that in case predicted QoS passes a threshold associated with a supported QoS profile, the prediction function network node will have to warn or notify the user equipment.

Thanks to the described aspect, by providing information concerning identity reference of the target serving cell to the prediction function network node, the prediction function network node is enabled to predict a change in QoS for the communication session of the user equipment. In order to help the prediction function network node to predict a change in QoS, a mechanism is provided to notify the prediction function network node regarding which target serving cell the user equipment is handed over to.

In a first possible implementation of the method according to the fourth aspect, the network node is associated with a source serving cell of the user equipment. Further, the step of obtaining information related to the communication session of the user equipment, further comprises: an indication of the capability of the user equipment to maintain at least two QoS profiles. The method further comprises the step of providing information concerning the capability of the user equipment to maintain at least two QoS profiles to the determined target serving cell.

Thereby, the target serving cell becomes aware of multiple QoS profile support of the user equipment and may recommend an appropriate QoS profile per QoS flow when it generates a Notification Control that is suited to the current QoS conditions.

In a second possible implementation of the method according to the fourth aspect, the network node is associated with a target serving cell of the user equipment. The method further comprises obtaining a P-QoS support capability of the user equipment; and providing an identity reference of the target serving cell to the prediction function network node when the communication session of the user equipment requires P-QoS support.

The target serving cell is thereby provided with information concerning whether a handed over PDU Session/user equipment requires P-QoS support, so that the target serving cell can notify its identity reference to the prediction function network node, e.g. after the handover has been executed. Such a functionality may not be expected when a handed over PDU Session does not require P-QoS support.

In a third possible implementation of the method according to the fourth aspect, or any implementation thereof, the method comprises the further step of handing over the communication session of the user equipment from the source serving cell to the target serving cell.

By providing the target serving cell identity on to the prediction function network node, it becomes possible for the prediction function network node to check whether there will be a QoS change for the communication session of the user equipment, given the capabilities, frequency ranges in use and current load of the target serving cell.

A Source Serving cell or an AMF can pass information concerning the target serving cell identity on to the prediction function network node once a handover has taken place. Alternatively, in some embodiments, the target serving cell can notify its identity to the prediction function network node when it knows that the current PDU Session requires P-QoS Support. The Source Serving cell or AMF may pass information regarding whether a PDU Session or UE in question requires P-QoS support on to the target serving cell, e.g. at the time of handover.

In a fourth possible implementation of the method according to the fourth aspect, or any implementation thereof, the method further comprises the step of providing information concerning the P-QoS support capability of the user equipment to the prediction function network node at about the time of creation of the communication session of the user equipment.

According to a fifth aspect of the present disclosure, a method in a prediction function network node is provided for determining a change in QoS of a communication session of a user equipment. The method comprises obtaining information related to the communication session of the user equipment, comprising an identity reference of the user equipment, an identity reference of the communication session, P-QoS support capability of the user equipment, an identity reference of the target serving cell from the network node, from the network node. The method also comprises determining a new QoS of the communication session of the user equipment when being served by the target serving cell, based on the obtained information.

Thanks to the described aspect, by passing information concerning whether the user equipment supports P-QoS and passing an identity reference of the target serving cell on to the prediction function network node, the prediction function network node is enabled to predict a change in QoS for the communication session of the user equipment. By obtaining information concerning target serving cell the user equipment, a change in QoS may be predicted.

In a first possible implementation of the method according to the fifth aspect, the method further comprises obtaining additional information associated with the target serving cell of the user equipment, and such additional information has potential to affect the QoS of the communication session of the user equipment when being served by the target serving cell. Further, the determined new QoS of the communication session is further based on the collected additional information.

The additional information associated with the target serving cell of the user equipment may comprise e.g. Radio Access Technology (RAT type), radio capabilities such as e.g. DC, CA, COMP, frequency in use, weather, road traffic intensity, and/or cell load or population. By collecting the additional information and predicting the new QoS of the communication session while taking the additional information into account, the new QoS may be predicted with better precision.

In a second possible implementation of the method according to the fifth aspect, or the first implementation thereof, the obtained information comprises an indication of the capability of the user equipment to maintain at least two QoS profiles. This information may be passed on e.g. at the time of PDU session establishment. Further, the determined new QoS of the communication session is further based on the obtained information concerning the capability of the user equipment to maintain at least two QoS profiles.

Thereby, the prediction function network node becomes aware of multiple QoS profile support of the user equipment and may predict a change in QoS of the communication session of the user equipment based on the multiple QoS profile support.

In a third possible implementation of the method according to the fifth aspect, or any implementation thereof, the method also comprises providing information concerning the determined new QoS of the communication session of the user equipment, to the user equipment. This determined QoS can be in terms of data rate, PER, PDB or a combination of these or 5QI.

The user equipment may be notified in a number of granularity: in a simplest form, the user equipment may be notified of a change in QoS e.g. when a handover is made to the new target cell. This means all user equipment may be notified irrespective of what application or QoS each user equipment requires. Alternatively, each user equipment may be uniquely notified depending on its location within the target cell, as QoS may vary at different physical locations within the cell, again irrespective of what exact Applications each user equipment runs or their exact QoS requirements in terms of 5QI. In another arrangement, the prediction function network node may examine QoS requirements of each flow identified by a QFI, make fine-granular estimation of QoS change per QoS flow and then notify the user equipment, e.g. on a per QoS flow basis.

By informing the user equipment concerning the new QoS, measures may be taken to adapt any application of the user equipment to the new QoS. This adaptation can happen at 2 levels. At the application layer level, the running V2X Application can decide as to what corrective action has to be taken in terms of changing speed, inter-vehicle distance or Level of Automation (LoA) in response to a notification. In another level (Non-Access Stratum), the QoS profile of a QoS flow will change that is suited to a predicted QoS. In case the new QoS is lower than the previous QoS level, the user is prepared and warned that the application may have to be switched off. In case the new QoS is higher than the previous QoS level, additional applications, or a more quality requiring application may be started.

In a fourth possible implementation of the method according to the fifth aspect, or any implementation thereof, the communication session of the user equipment is handed over from the source serving cell to the target serving cell. Further, the new QoS of the communication session of the user equipment is based on a difference in cell load and capabilities between the source serving cell and the target serving cell.

Hereby, the method is further specified.

According to a sixth aspect of the present disclosure, a method in a user equipment is provided, for enabling determination, by a prediction function network node according to the fourth aspect, of a change in QoS of a communication session of the user equipment. The method comprises obtaining information related to the target serving cell of the user equipment. Also, the method further comprises providing the obtained information related to the target serving cell, to the prediction function network node.

Thanks to the described aspect, by obtaining information related to the target serving cell of the user equipment and providing the information to the prediction function network node, an alternative mechanism is provided to provide the information concerning the target serving cell of the user equipment.

In a first possible implementation of the method according to the sixth aspect, the method further comprises transmitting information concerning P-QoS support capability of the user equipment to the network node according to the first aspect.

In a second possible implementation of the method according to the sixth aspect, or the first implementation thereof, the transmitted information further comprises an indication of the capability of the user equipment to maintain at least two QoS profiles.

Thereby, the prediction function network node becomes aware of multiple QoS profile support of the user equipment and may predict a change in QoS of the communication session of the user equipment based on the multiple QoS profile support.

In a third possible implementation of the method according to the sixth aspect, or any implementation thereof, the method also comprises receiving information concerning a change in QoS when being served by the target cell.

The user equipment and its user are thereby also alerted about the upcoming change in QoS. The user may for example save and terminate the currently running application when the change in QoS involves a decrease in QoS, and/or start a new function when the QoS is increased.

According to a seventh aspect of the present disclosure, a computer program is provided, with a program code for performing a method according to the fourth aspect in a network node according to the first aspect, a method according to the fifth aspect in a prediction function network node according to the second aspect, or a method according to the sixth aspect in a user equipment according to the third aspect when the computer program runs on a computer.

Thanks to the described aspect, by providing information concerning whether the user equipment supports P-QoS and provide an identity reference of the target serving cell to the prediction function network node, the prediction function network node is enabled to predict a change in QoS for the communication session of the user equipment.

Other objects, advantages and novel features of the aspects of the disclosure will become apparent from the following detailed description.

BRIEF DESCRIPTION OF THE DRAWINGS

Various embodiments are described in more detail with reference to attached drawings, illustrating examples of embodiments in which.

DETAILED DESCRIPTION

Embodiments described herein include a network node, a prediction function network node, a user equipment and methods therein, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
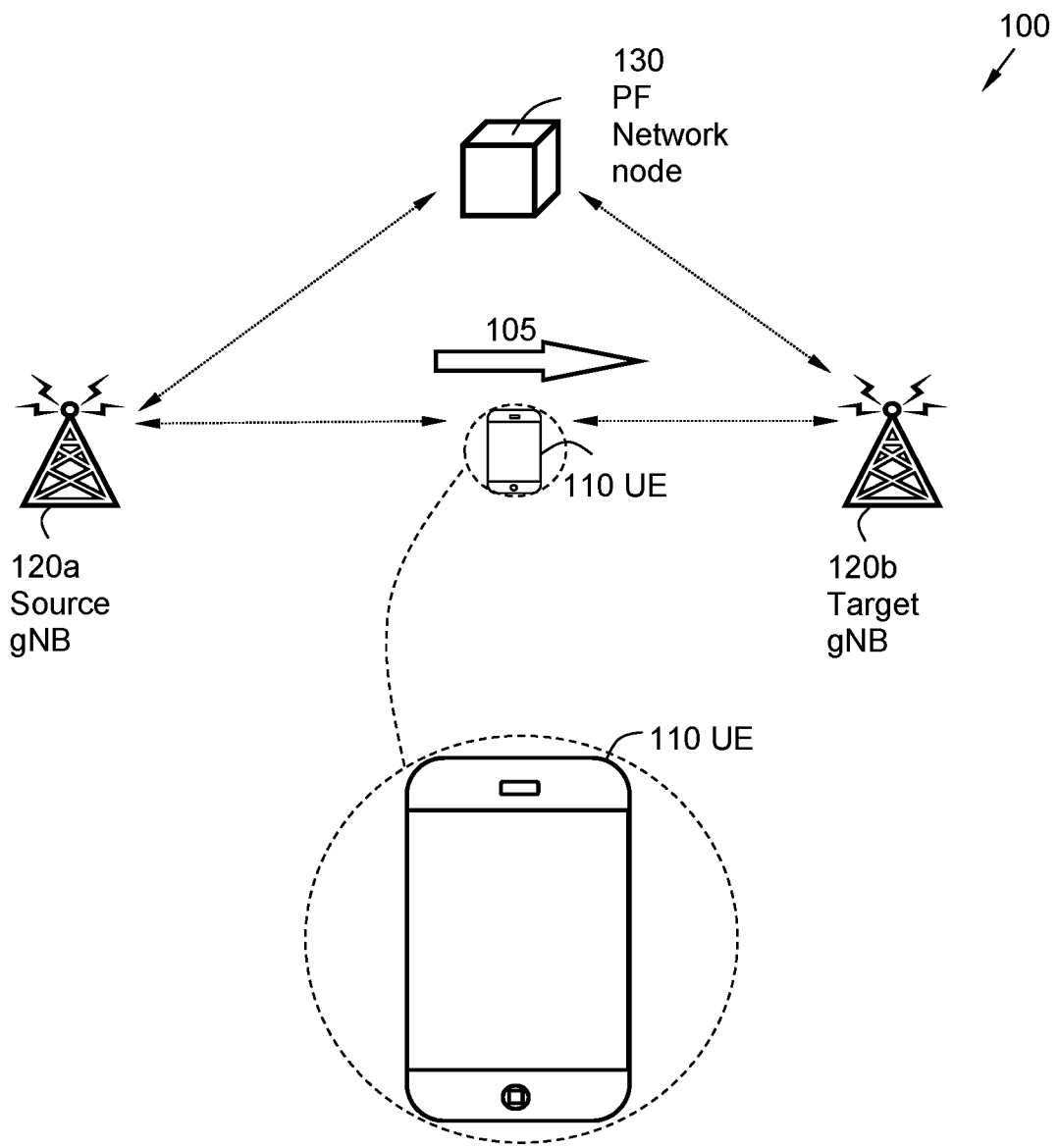
FIG. 1 is a block diagram illustrating a wireless communication network according to an embodiment.

FIG. 1 is a schematic illustration over a wireless communication network 100 comprising a User Equipment (UE) 110, for communication of signals, data and/or data packets over a wireless communication interface.

The expressions "wireless communication network", "wireless communication system" and/or "cellular telecommunication system" may within the technological context of this disclosure sometimes be utilised interchangeably.

The user equipment 110 may be moving, e.g. in the direction 105. The user equipment 110 may for example comprise an integrated communication device of a vehicle, e.g. configured for V2V/V2X communication with other vehicles, or other environmental structures. However, in other embodiments, the user equipment 110 may be a cellular mobile telephone or similar communication device, used by a user which is moving on a vehicle such as a train.

When moving between different locations, the user equipment 110 may have to make a hand over from a source serving cell 120a, to a target serving cell 120b. Information concerning the user equipment 110 and/or the target serving cell 120b may be provided to a prediction function network node 130. The prediction function network node 130 is configured to perform a prediction function concerning a change in Quality of Service (QoS) associated with a Packet Data Unit (PDU) Session of the user equipment 110.

The prediction function network node 130 needs to be notified about an identity of one or many cells 120a, 120b that currently serve the user equipment 110 especially after the handover. The user equipment 110 may be served by more than one serving cell 120a, 120b, simultaneously especially when dual/multi connectivity is used. When the PDU Session is established and the predictive-QoS (P-QoS) Support is required for such a session, an AMF or SMF may decide on the need to support P-QoS for the PDU session and indicates to the prediction function network node 130 about an identity of cells 120b, or next generation NodeBs (gNBs), that serve the user equipment 110 along with e.g. an identity reference of the communication session (Session ID), an identity reference of the user equipment 110 (UE ID), Application type, predictive-Quality of Service support capability of the User Equipment 110, currently supported QoS profile per flow, details of multiple QoS profiles' support per flow belonging to the PDU Session, and thresholds associated with each supported QoS profiles. The prediction function network node 130 may subsequently collect UE-specific trajectory information while mapping predicted UE positions to the cells 120b before making predictions about potential QoS change. If QoS changes such that it passes thresholds associated with currently supported QoS profiles, the prediction function network node 130 may notify the UE 110. It may be assumed that the prediction function network node 130 is notified of capabilities of each cell 120a, 120b in terms of e.g. RAT type used, support of CA, DC, COMP, frequency ranges in use when the respective cell 120a, 120b is (re)configured. At the same time, the prediction function network node 130 periodically may collect load and residual capacity information of each cell 120a, 120b. Also, the prediction function network node 130 may constantly collect 3rd party information such as weather, road traffic within a PLMN area, which may affect the QoS. Now when a handover happens, by notifying the target cell information to the prediction function network node 130, it is possible to predict QoS associated with a handed over PDU session of the user equipment 110 based on already collected cell-specific capability and load information and weather, road traffic conditions (both predicted and currently prevailing) that apply to the given target cell 120b. In other words, knowledge of the identities of (current and future) serving cell(s) 120a, 120b are vital to the prediction function network node 130 for the following reasons.

The Radio Access Network (RAN) is always a bottleneck and hence, it is better to know from an identity of the target serving cell 120b (e.g., cell-ID) what Radio Access Technology (RAT) such as e.g., LTE, 5G, etc., it operates and this will be helpful in determining QoS change. Although the prediction function network node 130 collects information regarding cell load, by passing a cell-ID, the prediction function network node 130 can figure out a new QoS for the user equipment 110 within that cell 120a, 120b as each cell 120a, 120b is dimensioned based on local traffic and hence, for predicting local traffic, the prediction function network node 130 needs to know a current cell-ID of the serving cell 120a, 120b. There may be overlapping cells 120a, 120b such that the prediction function network node 130 cannot figure out a currently serving cell (i.e., new target) from a UE location—hence, explicit cell-ID may be required. From cell-ID, it may be possible to find out frequency in use, history of Reference Signal Received Quality (RSRQ), Reference Signal Received Power (RSRP), Received Strength Signal Indicator (RSSI) or Signal-to-Interference-plus-Noise Ratio (SNIR) measurements per different UE locations and time of a day, history of Radio Link Failure (RLF)/Hand Over Failure (HOF) information per different UE locations and time of a day and related radio propagation information, cell capabilities in terms of e.g. Carrier Aggregation, CoMP, Dual Connectivity, and all these will help the prediction function network node 130 to make sound predictions. This information may be extracted from a database.

Figure 2:
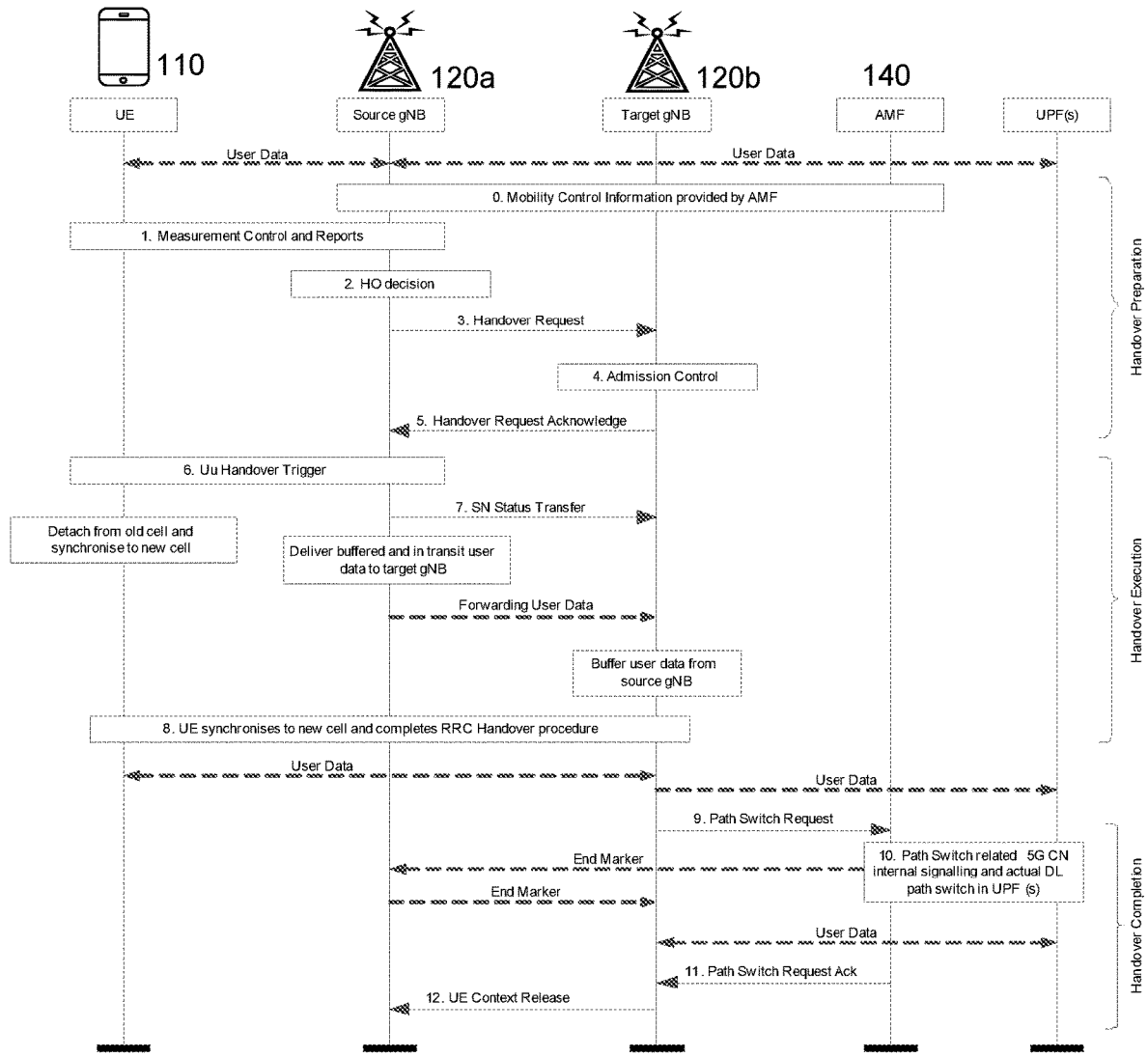
FIG. 2 is a combined flow chart and signalling scheme in a wireless communication network according to an embodiment.

When applying such a principle along the same lines, the prediction function network node 130 may be notified regarding identifiers of new/target serving cells 120b after a handover of the user equipment 110 has taken place. A source cell/gNB 120a or target cell/gNB 120b may notify the prediction function network node 130 of the target cell/gNB 120b details for the prediction function network node 130 to make use of already collected prediction related data pertaining to the new serving cell/gNB 120b after Step 12 of FIG. 2, illustrating an example of signalling made in association with a handover of the user equipment 110. Alternatively, an Access and Mobility Management Function (AMF) network node/Session Management Function (SMF) network node 140 may notify the prediction function network node 130 of the target serving cell/gNB 120b details after Step 11 of FIG. 2. The source cell 120a, the target cell 120b and/or the AMF network node may all be referred to as network nodes 120a, 120b, 140 in a common term.

Figure 3:
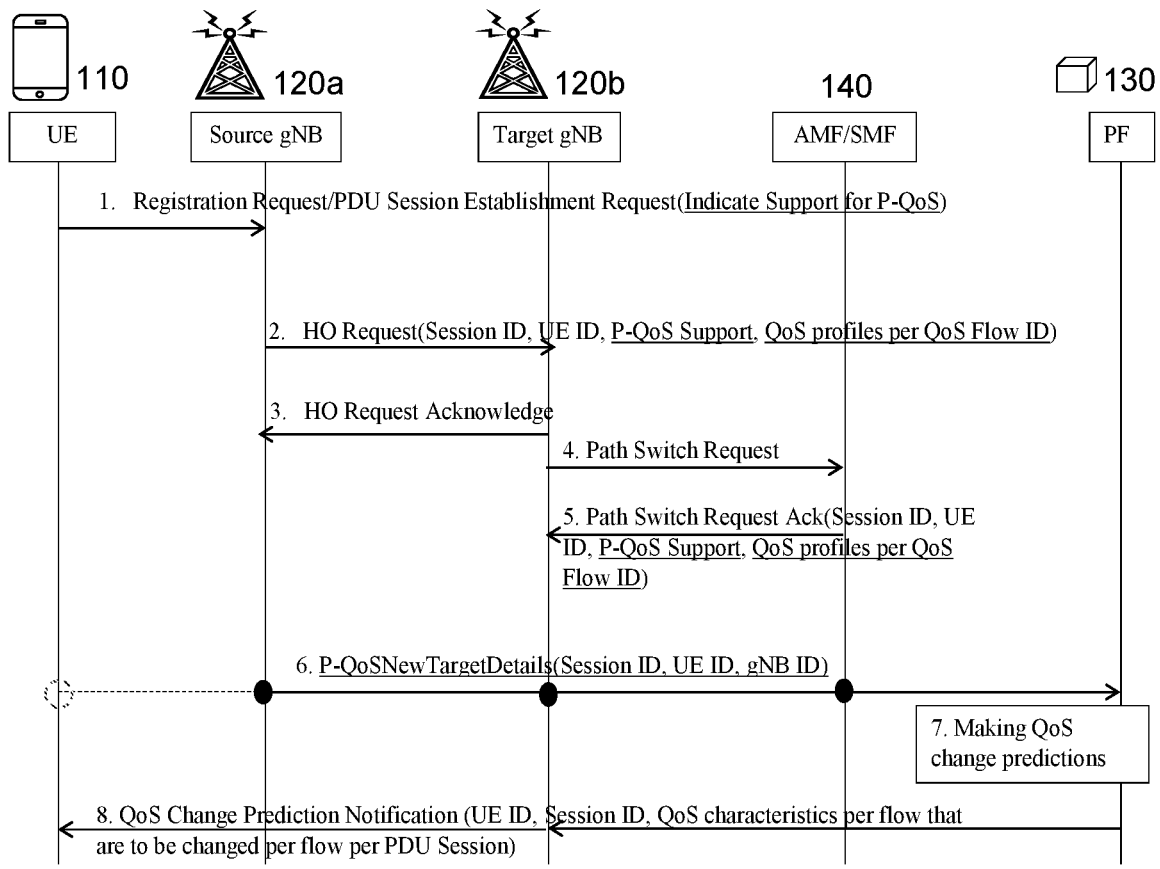
FIG. 3 is a combined flow chart and signalling scheme in a wireless communication network according to an embodiment.

FIG. 3 schematically illustrates signalling between the source cell 120a, the target serving cell 120b, the AMF 140 and the prediction function network node 130. Both the source cell 120a and the AMF 140 may know whether the user equipment 110 is able to support P-QoS or not. Hence, it is possible for either the source serving cell 120a, or the AMF 140 to notify the prediction function network node 130 regarding a new target serving cell/gNB 120b that will serve the user equipment 110 or PDU Session in question after the handover to the target serving cell 120b.

For the target serving cell/gNB 120b to notify its identity to the prediction function network node 130, firstly the target serving cell/gNB 120b has to know whether the user equipment 110 or PDU Session in question supports P-QoS. Hence, P-QoS support can be indicated by the source serving cell/gNB 120a when it generates a Handover (HO) Request as shown by FIG. 3.

According to an embodiment, after the UE Context Release is received by the source serving cell/gNB 120a as shown by step 12 in FIG. 2, the source serving cell/gNB 120a can notify the prediction function network node 130 about the identities of the new cells/gNBs 120b that currently serve the user equipment 110 in question, after the handover.

According to another arrangement, the AMF 140 can indicate the same to the prediction function network node 130 after it has sent Path Switch Ack in step 11 as depicted in FIG. 2. This is shown by Step 6 in FIG. 3.

As mentioned earlier, for the target serving cell/gNB 120b to notify its identity to the prediction function network node 130 in step 6 of FIG. 3, the target serving cell/gNB 120b need to know whether the user equipment 110 can support P-QoS.

For this purpose, the source serving cell/gNB 120a may indicate whether the user equipment 110 supports P-QoS for the given PDU Session to the target serving cell/gNB 120b when the handover occurs. The source serving cell/gNB 120a can include the UE capability in terms of P-QoS support in the Handover Request. As shown in Step 6 of FIG. 3, Session ID and identities of currently serving cells 120a, 120b can be passed on to the prediction function network node 130.

According to some embodiments, source serving cell/gNB 120a may pass on to a target serving cell 120b regarding multiple QoS profiles per each QoS flow belonging to the PDU Session in the Handover Request as depicted by Step 2 in FIG. 3. Alternatively, such information can be passed to a target serving cell 120b by the AMF 140 in Step 5 as depicted in FIG. 3. The AMF 140 may tap such information at the time of PDU Session establishment. With such information, the target serving cell/gNB 120b can include appropriate QoS profile per flow when it generates the Notification Control when the current Guaranteed Bit Rate (GBR) QoS profile is difficult to be supported.

In the Handover Request, the Source serving cell/gNB 120a may indicate whether the user equipment 110 and/or the PDU Session in question supports P-QoS and/or details of multiple QoS profile support per QoS.

Possible QoS profiles may comprise: 5G QoS Indicator (5QI), Allocation and Retention Priority (ARP), Reflective QoS Indicator (RQI) in the case of non-GBR traffic, Guaranteed Flow Bit Rate (GFBR), Maximum Flow Bit Rate (MFBR), Notification control and/or Maximum Packet Loss Rate for GBR traffic.

Alternatively, in some embodiments, the AMF 140 may indicate as part of Step 5 of FIG. 3 whether the user equipment 110 and/or PDU Session in question supports P-QoS and/or details of multiple QoS profile support per QoS. Any of the source serving cell/gNB 120a, target serving cell/gNB 120b and/or AMF 140 may indicate information concerning the target serving cell/gNB 120b to the prediction function network node 130.

Figure 4:
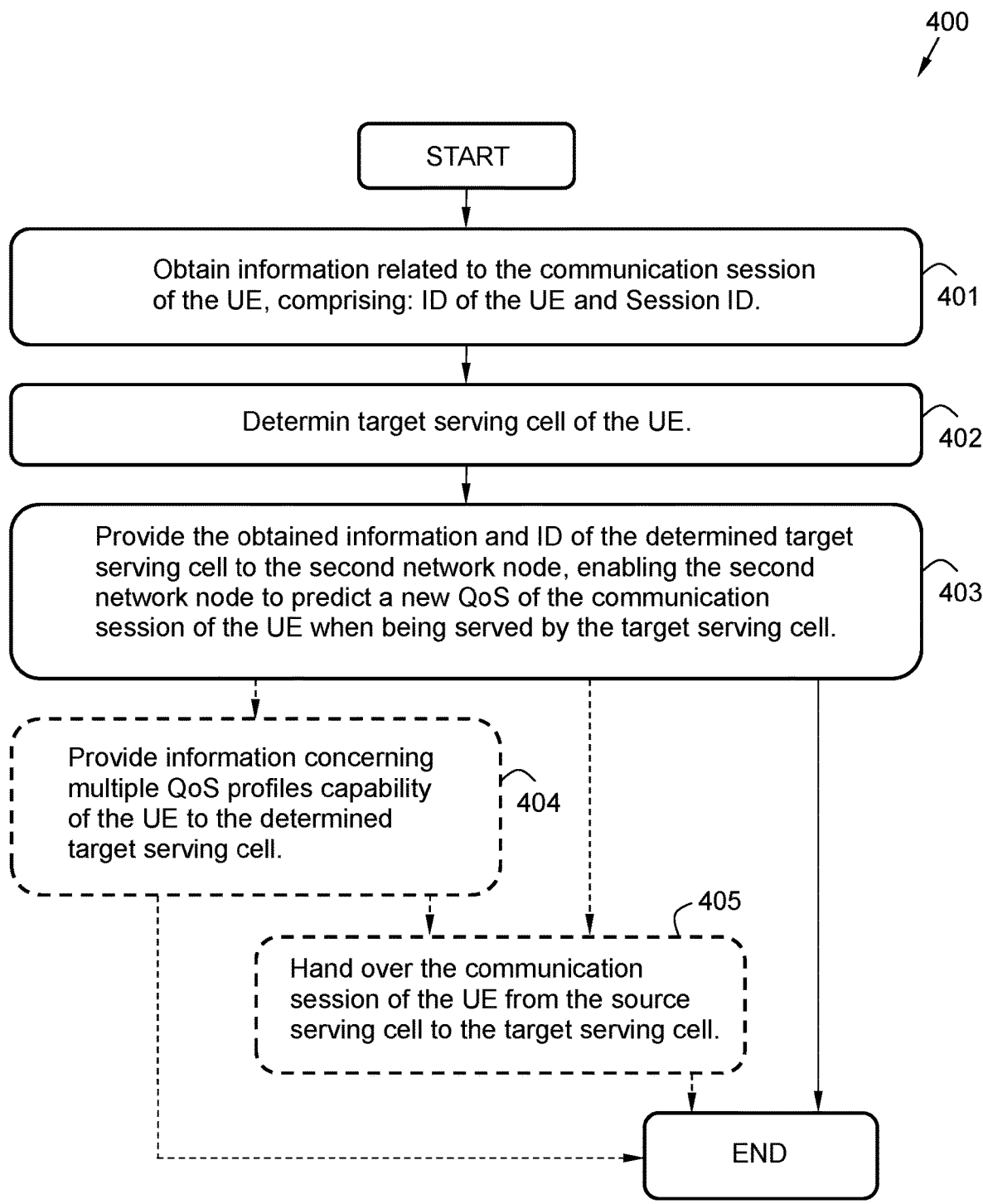
FIG. 4 is a flow chart illustrating a method in a network node according to an embodiment.

FIG. 4 is a flow chart illustrating embodiments of a method 400 in a network node 120a, 120b, 140, for enabling determination, by a prediction function network node 130, of a change in QoS of a communication session of a user equipment 110, after a handover.

The network node 120a, 120b, 140 may be associated with, i.e. comprised in a source serving cell 120a of the user equipment 110, a target serving cell 120b of the user equipment 110, or an AMF/SMF 140 respectively in different embodiments.

In order to enable the prediction function network node 130 to correctly determine the change in QoS, the method 400 may comprise a number of steps 401-405. However, some of these steps 401-405 may be performed solely in some alternative embodiments, like e.g. step 404, and/or 405. Further, the described steps 401-405 may be performed in a somewhat different chronological order than the numbering suggests. The method 400 may comprise the subsequent steps:

Step 401 comprises obtaining information related to the communication session of the user equipment 110, comprising: an identity reference of the user equipment 110; and an identity reference of the communication session. It is assumed that the prediction function network node 130 will know from the identity reference of the PDU communication session as to how many QoS flows the communication session has, identity of each QoS flow (e.g., QFI), what QoS profile is currently supported per QoS flow and thresholds associated with each QoS profile. Such information is passed on to the prediction function network node 130 when a PDU session is established (especially session id and QoS flows belonging to that session id, QoS profiles supported per each QoS flow and thresholds associated with each QoS profile) and when PDU Session modification happens (especially the currently supported QoS profile per QoS flow). Currently serving cell 120a, AMF 140 or SMF can pass such information onto the prediction function network node 130. The prediction function network node 130 may notify the UE 110 when the predicted QoS passes thresholds associated with supported QoS profiles of a QoS flow.

In some embodiments wherein the network node 120a, 120b, 140 is associated with a source serving cell 120a of the user equipment 110, the step of obtaining information related to the communication session of the user equipment 110, further may comprise an indication of the capability of the user equipment 110 to maintain at least two QoS profiles, i.e. capability of multiple QoS profiles.

In some embodiments wherein the network node 120a, 120b, 140 is associated with a target serving cell 120b of the user equipment 110, the step of obtaining information related to the communication session of the user equipment 110, further may comprise obtaining P-QoS support capability of the user equipment 110.

Step 402 comprises determining the target serving cell 120b of the user equipment 110 after a handover from the source serving cell 120a.

Step 403 comprises providing the obtained 401 information and an identity reference of the determined 402 target serving cell 120b to the prediction function network node 130, enabling the prediction function network node 130 to determine a new QoS of the communication session of the user equipment 110 when being served by the target serving cell 120b.

In some embodiments wherein the network node 120a, 120b, 140 is associated with a target serving cell 120b of the user equipment 110, the step providing the obtained 401 information related to the communication session of the user equipment 110, further may comprise providing an identity reference of the target serving cell 120b to the prediction function network node 130 when the communication session of the user equipment 110 requires P-QoS support.

In yet some embodiments, an indication of the P-QoS of the user equipment 110 may be provided to the prediction function network node 130.

Step 404, which may be performed only in some embodiments, comprises providing information concerning the capability of the user equipment 110 to maintain at least two QoS profiles to the determined 402 target serving cell 120b.

This information may previously have been obtained from the user equipment 110.

Further, an indication of the obtained P-QoS of the user equipment 110 may be provided to the prediction function network node 130 in some embodiments.

Step 405, which may be performed only in some embodiments, comprises handing over the communication session of the user equipment 110 from the source serving cell 120a to the target serving cell 120b.

After the handover, the target serving cell 120b becomes the new serving cell of the communication session of the user equipment 110.

Figure 5:
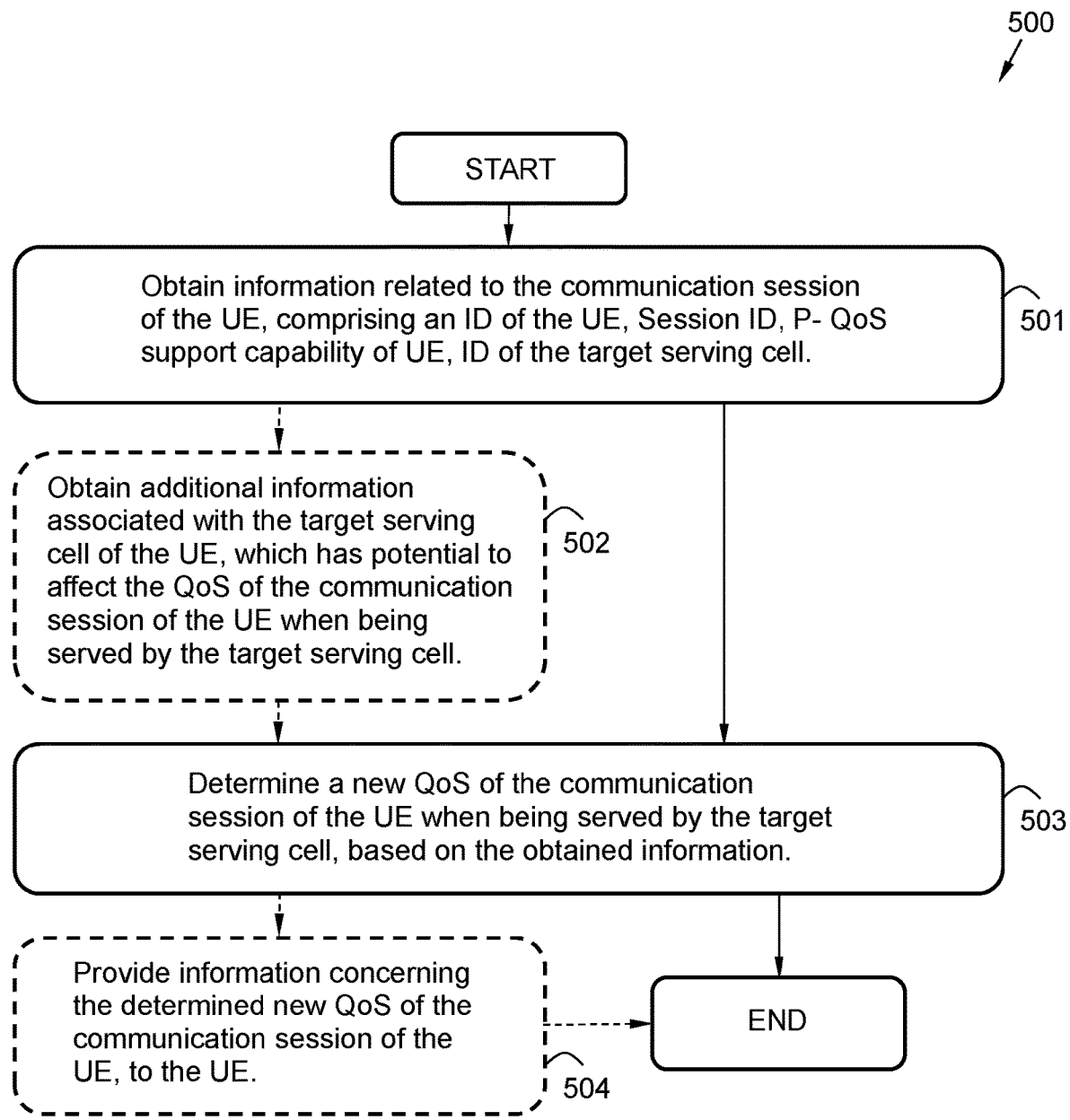
FIG. 5 is a flow chart illustrating a method in a prediction function network node according to an embodiment.

FIG. 5 is a flow chart illustrating embodiments of a method 500 in a prediction function network node 130 for determining a change in QoS of a communication session of a user equipment 110, after a handover.

In order to correctly determine the change in QoS, the method 500 may comprise a number of steps 501-504. However, some of these steps 501-504 may be performed solely in some alternative embodiments, like e.g. step 504. Further, the described steps 501-504 may be performed in a somewhat different chronological order than the numbering suggests. The method 500 may comprise the subsequent steps:

Step 501 comprises obtaining information related to the communication session of the user equipment 110, comprising an identity reference of the user equipment 110; an identity reference of the communication session; P-QoS support capability of the user equipment 110; and/or an identity reference of the target serving cell 120b from the network node 120a, 120b, 140.

The obtained 501 information may also comprise an indication of the capability of the user equipment 110 to maintain at least two QoS profiles per QoS flow, i.e. multiple QoS capability, in some embodiments.

The communication session of the user equipment 110 may be handed over from the source serving cell 120a to the target serving cell 120b, in some embodiments.

Step 502, which may be performed only in some embodiments, comprises obtaining additional information associated with the target serving cell 120b of the user equipment 110, which additional information has potential to affect the QoS of the communication session of the user equipment 110 when being served by the target serving cell 120b.

This additional information may comprise for example specification of the RAT, capabilities, weather indication at the area of the target serving cell 120b, road traffic intensity at the area of the target serving cell 120b, and/or cell load/population. The capacity of the target serving cell 120b may influence the QoS of the communication session of the user equipment 110. Target cell specific history of RSRQ, RSRP, RSSI or SNIR measurements per different UE locations and time of a day, history of RLF/HOF information per different UE locations and time of a day and related radio propagation information, cell capabilities in terms of e.g. Carrier Aggregation, CoMP, Dual Connectivity can be useful in the prediction.

Step 503 comprises determining a new QoS of the communication session of the user equipment 110 when being served by the target serving cell 120b, based on the obtained 501 information.

The determined 503 new QoS of the communication session may be further based on the collected 502 additional information in some embodiments.

The determined 503 new QoS of the communication session may be further based on the obtained 501 information concerning the capability of the user equipment 110 to maintain at least two QoS profiles.

The determination 503 of the new QoS of the communication session of the user equipment 110 may be based partly on capabilities and capacity of target serving cell 120b and/or local weather and traffic situations.

Step 504, which may be performed only in some embodiments, comprises providing information concerning the determined 503 new QoS of the communication session of the user equipment 110, to the user equipment 110. This can be per QFI that is generated when predicted QoS passes thresholds associated with one or more QoS characteristics (packet error rate, packet delay budget, GFBR, etc.) of a QoS profile.

By providing information concerning the new QoS to the user equipment 110, measures may be taken by the user equipment 110, based on that information. In case the new QoS is reduced, the user may receive a warning that the current service may be inhibited, encouraging him/her to download/save information before the handover is performed.

In case the new QoS is increased, the user may be informed and may (re-) start a service, for example.

Figure 6:
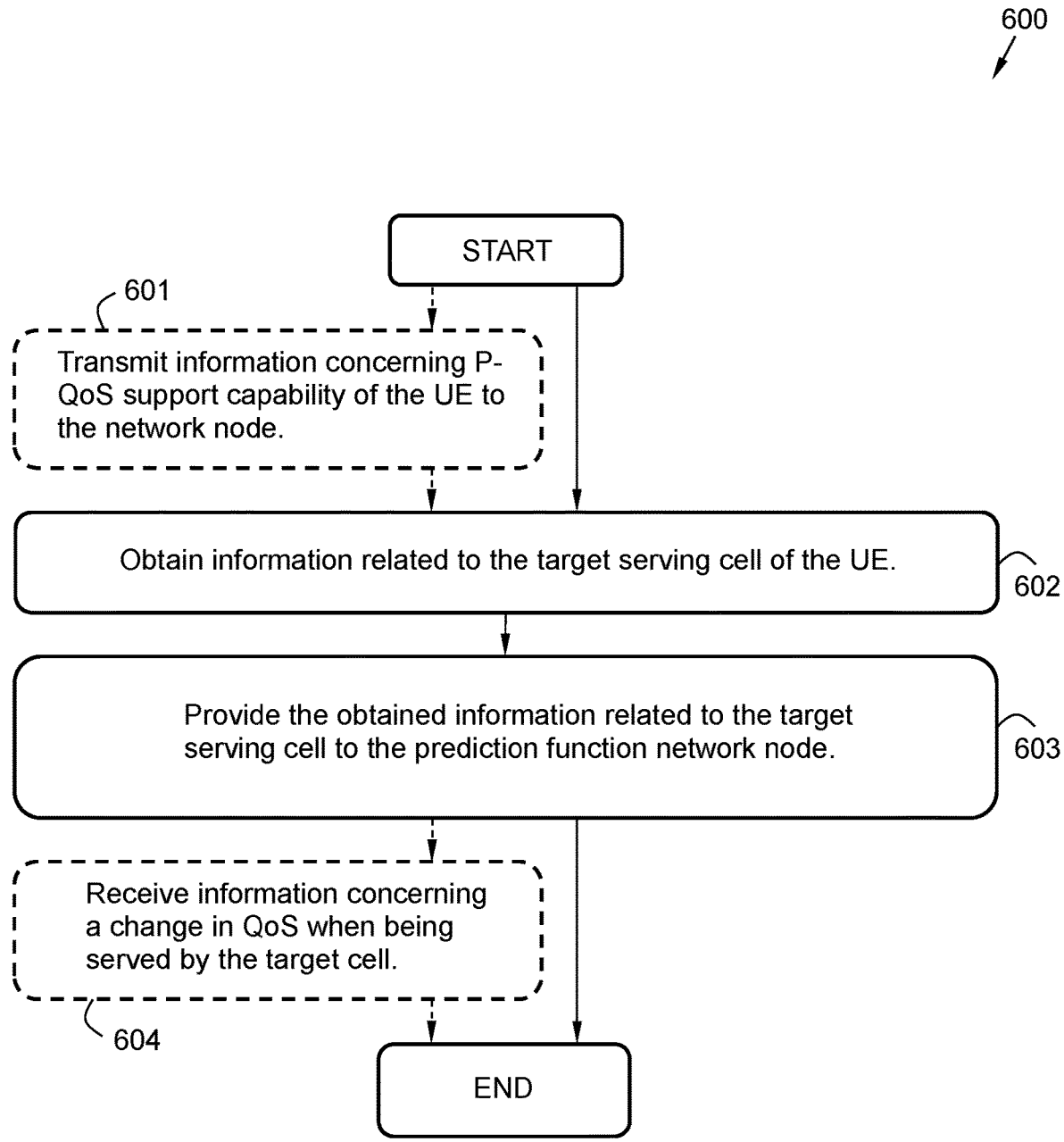
FIG. 6 is a flow chart illustrating a method in a user equipment according to an embodiment.

FIG. 6 is a flow chart illustrating embodiments of a method 600 in a user equipment 110 for enabling determination, by a prediction function network node 130, of a change in QoS of a communication session of the user equipment 110, after a handover.

In order to correctly enable the prediction function network node 130 to determine the change in QoS, the method 600 may comprise a number of steps 601-604. However, some of these steps 601-604 may be performed solely in some alternative embodiments, like e.g. step 601 and step 604. Further, the described steps 601-604 may be performed in a somewhat different chronological order than the numbering suggests. The method 600 may comprise the subsequent steps:

Step 601 which may be performed only in some embodiments, comprises transmitting information concerning P-QoS support capability of the user equipment 110 to the network node 120a, 120b, 140; typically to the serving network node 120a.

The serving network node 120a may then, in a handover scenario, provide the information to the target network node 120b and/or the AMF 140.

Step 602 comprises obtaining information related to the target serving cell 120b of the user equipment 110.

The obtained information may comprise an identity reference of the target serving cell 120b. This information may be received from the source serving cell 120a in some embodiments.

Step 603 comprises providing the obtained 602 information related to the target serving cell 120b, to the prediction function network node 130.

The information related to the target serving cell 120b may be provided to the prediction function network node 130 for enabling the prediction function network node 130 to determine the change in QoS after the handover to the target serving cell 120b.

The information may be provided together with an identity reference of the user equipment 110; an identity reference of the communication session; and/or P-QoS support capability of the user equipment 110.

The information may also comprise an indication of the capability of the user equipment 110 to maintain at least two QoS profiles, i.e. multiple QoS capability, in some embodiments.

Step 604 which may be performed only in some embodiments, comprises receiving information concerning a change in QoS when being served by a target cell 120b.

The obtained information may comprise a warning that the QoS of the communication session of the user equipment 110 will be reduced and that the connection may be lost. Alternatively, the information may comprise a notice that the QoS will be increased, enabling the user to e.g. activate a functionality.

Figure 7:
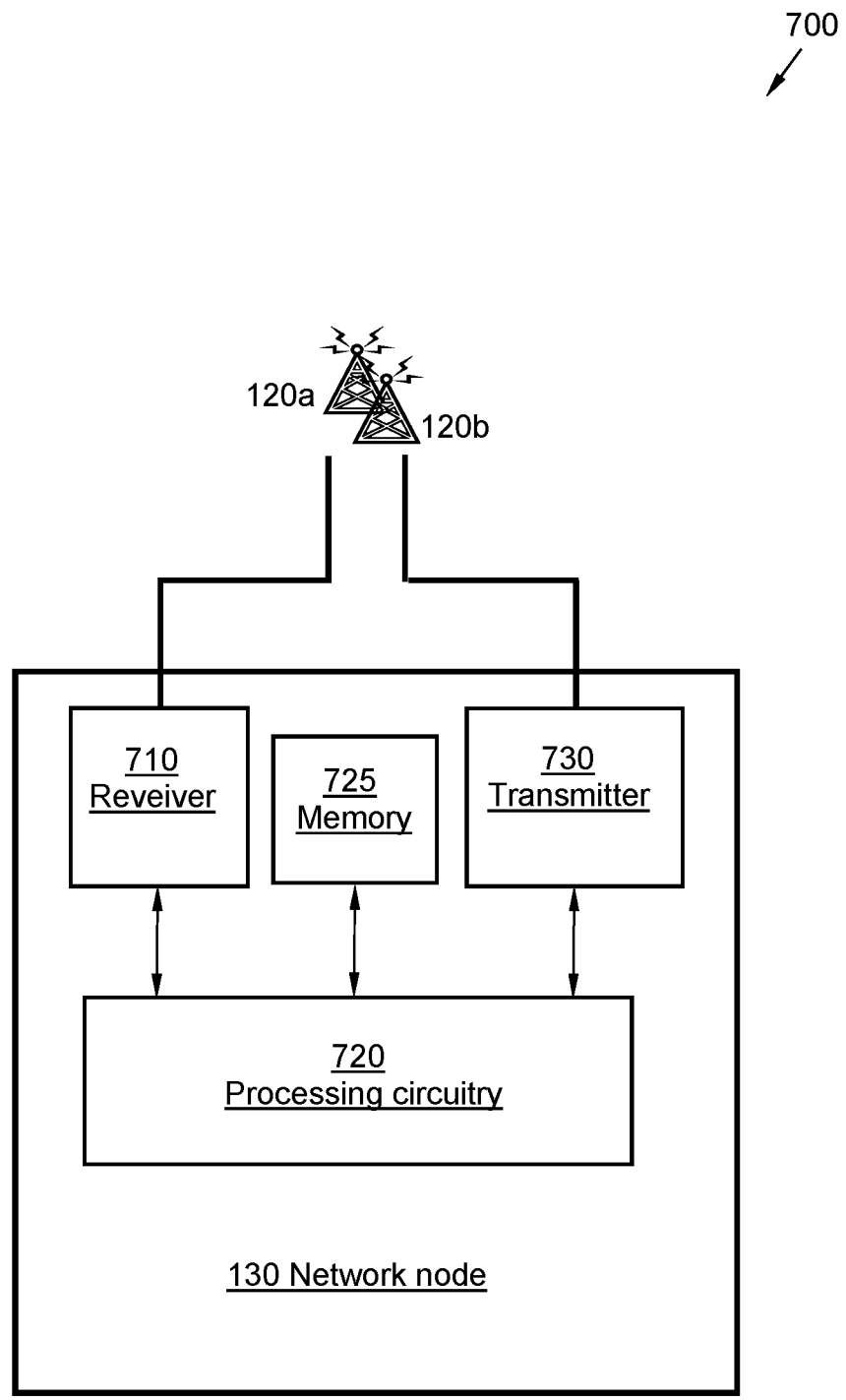
FIG. 7 is a block diagram illustrating a device according to an embodiment.

FIG. 7 illustrates an embodiment of a prediction function network node 130. The prediction function network node 130 is configured to perform at least some of the method steps 501-504 for determining a change in QoS of a communication session of a user equipment 110.

The prediction function network node 130 is configured to obtain information related to the communication session of the user equipment 110, comprising an identity reference of the user equipment 110; an identity reference of the communication session; P-QoS support capability of the user equipment 110 and/or an identity reference of the target serving cell 120b from the network node 120a, 120b, 140. Further, the prediction function network node 130 is configured to determine a new QoS of the communication session of the user equipment 110 when being served by the target serving cell 120b, based on the obtained information.

In some embodiments, the prediction function network node 130 may also be configured to obtain additional information associated with the target serving cell 120b of the user equipment 110, which additional information has potential to affect the QoS of the communication session of the user equipment 110 when being served by the target serving cell 120b. In addition, the prediction function network node 130 may be further configured to determine the new QoS of the communication session, further based on the obtained additional information.

The prediction function network node 130 may furthermore, in yet some embodiments wherein the obtained information comprises an indication of the capability of the user equipment 110 to maintain at least two QoS profiles be configured to determine the new QoS of the communication session, further based on the obtained information concerning the capability of the user equipment 110 to maintain at least two QoS profiles.

According to some embodiments, the prediction function network node 130 may be configured to provide information concerning the determined new QoS of the communication session of the user equipment 110, to the user equipment 110.

The prediction function network node 130 may also, in some embodiments wherein the communication session of the user equipment 110 is handed over from the source serving cell 120a to the target serving cell 120b, be configured to determine the new QoS of the communication session of the user equipment 110, based partly on capabilities and capacity of target serving cell 120b and local weather and traffic situation.

The prediction function network node 130 may comprise a processing circuitry 720. The processing circuitry 720 is configured to perform at least some of the above described actions 501-504, when loaded into the processing circuitry 720.

Such processing circuitry 720 may comprise one or more instances of a processing circuit, i.e. a Central Processing Unit (CPU), a processing unit, a processor, an Application Specific Integrated Circuit (ASIC), a microprocessor, or other processing logic that may interpret and execute instructions. The herein utilised expression "processing circuitry" may thus represent a processing circuitry comprising a plurality of processing circuits, such as, e.g., any, some or all of the ones enumerated above.

Furthermore, the prediction function network node 130 also may comprise a receiving circuit 710 in some embodiments, for receiving signalling from the network node 120a, 120b, 140 over a wired or wireless communication interface.

The prediction function network node 130 also comprises a transmitting circuit 730, configured to transmit signals to the network node 120a, 120b, 140 over the wired or wireless communication interface.

The method 400 comprising the method steps 401-405; the method 500 comprising the method steps 501-504; and/or the method 600 comprising the method steps 601-604 may be implemented through the one or more processing circuitries 720 together with computer program product for performing the functions of the methods 400, 500, 600, for (enabling) determination, by a prediction function network node 130 of a change in QoS of a communication session of the user equipment 110.

Thus, a computer program comprising program code for performing the method 400 according to any embodiment of steps 401-405, the method 500 comprising the method steps 501-504, and/or the method 600 comprising the method steps 601-604 may be performed when the computer program runs on a computer.

The computer program product mentioned above may be provided for instance in the form of a data carrier carrying computer program code for performing the respective methods 400, 500, 600. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the network node 120a, 120b, 140, the prediction function network node 130 and/or user equipment 110, e.g., over an Internet or an intranet connection.

The terminology used in the description of the embodiments as illustrated in the accompanying drawings is not intended to be limiting of the described methods 400, 500, 600, network nodes 120a, 120b, 140, prediction function network node 130 and/or user equipment 110. Various changes, substitutions and/or alterations may be made, without departing from the invention as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware but may also be distributed in other forms such as via Internet or other wired or wireless communication system.

What is claimed is:

1. A source serving node, comprising:
processing circuitry configured to:
  obtain information related to a communication session of a user equipment, comprising:
    an identity reference of the user equipment,
    an identity reference of the communication session, and
    an indication of the capability of the user equipment to maintain at least two Quality of Service profiles,
  determine a target serving cell of the user equipment,
  provide an identity reference of the determined target serving cell, and
  provide information concerning the indication of the capability of the user equipment to maintain at least two Quality of Service profiles; and
a transmitter configured to:
  transmit the obtained information related to the communication session of the user equipment and the identity reference of the determined target serving cell to a prediction function network node thereby enabling the prediction function network node to determine a new Quality of Service of the communication session of the user equipment when being served by the determined target cell; and
  transmit, to the determined target cell in a handover request, the information concerning the indication of the capability of the user equipment to maintain the at least two Quality of Service profiles,
wherein the source serving node is associated with a source serving cell of the user equipment.

2. The source serving node according to claim 1, wherein the processing circuitry is further configured to provide predictive-Quality of Service support capability of the user equipment, and wherein the transmitter is further configured to transmit the predictive-Quality of Service support capability to the prediction function network node at a time of the establishment of the communication session of the user equipment.

3. A system, comprising:
the source serving node according to claim 1; and
a prediction function network node, comprising:
  processing circuitry configured to:
    obtain information from the source serving node and related to the communication session of the user equipment, the information comprising:
      an identity reference of the user equipment,
      an identity reference of the communication session,
      predictive-Quality of Service support capability of the user equipment, and
      an identity reference of a target serving cell of the user equipment; and
    determine, based on the obtained information, the new Quality of Service of the communication session of the user equipment when being served by the target serving cell.

4. The system according to claim 3, wherein the processing circuitry of the prediction function network node is further configured to:
  obtain additional information associated with the target serving cell of the user equipment, the additional information having potential to affect the Quality of Service of the communication session of the user equipment when being served by the target serving cell; and
  determine, further based on the additional obtained information, the new Quality of Service of the communication session.

5. The system according to claim 3, the information obtained by the processing circuitry of the prediction function node from the source serving node and related to the communication session of the user equipment further comprising an indication of a capability of the user equipment to maintain at least two Quality of Service profiles, wherein the processing circuitry of the prediction function node is configured to determine, based further on the indication of the capability of the user equipment to maintain the at least two Quality of Service profiles, the new Quality of Service of the communication session.

6. The system according to claim 3, wherein the prediction function node further includes a transmitter configured to provide, to the user equipment, information concerning the determined new Quality of Service of the communication session of the user equipment.

7. A system, comprising:
the source serving node according to claim 1; and
a user equipment configured to:
  obtain information related to the target serving cell of the user equipment; and
  provide the obtained information related to the target serving cell to the prediction function network node.

8. The system according to claim 7, the user equipment being further configured to:
  transmit information concerning predictive-Quality of Service support capability of the user equipment to the source serving node.

9. The system according to claim 7, the user equipment being further configured to transmit the indication of the capability of the user equipment to maintain the at least two Quality of Service profiles.

10. The source serving node according to claim 1, wherein the at least two Quality of Service profiles comprise at least one of: a 5G Quality of Service Indicator (5QI), Allocation and Retention Priority (ARP), a Reflective Quality of Service Indicator (RQI) for non-Guaranteed Bit Rate (GBR) traffic, Guaranteed Flow Bit Rate (GFBR), Maximum Flow Bit Rate (MFBR), Notification control, or a Maximum Packet Loss Rate for GBR traffic.

11. A method performed by a source serving node for determining a new Quality of Service of a communication session of a user equipment, the method comprising:
  obtaining information related to the communication session of the user equipment the information comprising:
    an identity reference of the user equipment,
    an identity reference of the communication session, and
    an indication of the capability of the user equipment to maintain at least two Quality of Service profiles;
  determining a target serving cell of the user equipment, the target serving cell having an identity reference;
  transmitting the obtained information related to the communication session of the user equipment and the identity reference of the determined target serving cell to a prediction function network node to determine the new Quality of Service of the communication session of the user equipment when being served by the determined target cell, and
  transmitting, to the determined target cell in a handover request, the information concerning the indication of the capability of the user equipment to maintain the at least two Quality of Service profiles,
  wherein the source serving node is associated with a source serving cell of the user equipment.

12. A non-transitory computer readable medium comprising processor-executable program code that, when executed by a processor, causes the processor to perform the method according to claim 11.

* * * * *

UNITED STATES PATENT AND TRADEMARK OFFICE
CERTIFICATE OF CORRECTION

| | |
|---|---|
| PATENT NO. | : 11,700,550 B2 |
| APPLICATION NO. | : 17/141916 |
| DATED | : July 11, 2023 |
| INVENTOR(S) | : Vakeesar et al. |

It is certified that error appears in the above-identified patent and that said Letters Patent is hereby corrected as shown below:

On the Title Page

Page 2: item [56] Other Publications, Left-Hand Column, Line 2: "Wireless Access Network," Southeast University, total 35 pages" should read -- Wireless Access Network," Southeast University, total 65 pages --.

In the Claims

Claim 11: Column 20, Line 24: "sion of the user equipment the information comprising:" should read -- sion of the user equipment, the information comprising: --.

Signed and Sealed this
Fourteenth Day of November, 2023

Katherine Kelly Vidal
*Director of the United States Patent and Trademark Office*